Sept. 6, 1955  J. G. AMES  2,717,050
ROOM DEHUMIDIFIER

Filed Nov. 28, 1951  7 Sheets-Sheet 1

Inventor:
James G. Ames
By Schrader, Merream,
Hofgren & Brady
Attorneys

Sept. 6, 1955   J. G. AMES   2,717,050
ROOM DEHUMIDIFIER
Filed Nov. 28, 1951   7 Sheets-Sheet 3

Inventor
James G. Ames
By Schroeder, Merriam,
Hofgren & Brady
Attorneys

Sept. 6, 1955          J. G. AMES          2,717,050

ROOM DEHUMIDIFIER

Filed Nov. 28, 1951          7 Sheets-Sheet 6

Inventor:
James G. Ames
By Schroeder, Merriam,
Hofgren & Brady
Attorneys

Fig. 14

United States Patent Office 2,717,050
Patented Sept. 6, 1955

2,717,050

ROOM DEHUMIDIFIER

James G. Ames, Aurora, Ill.

Application November 28, 1951, Serial No. 258,647

21 Claims. (Cl. 183—4.1)

This invention relates to a room dehumidifier, and in particular it relates to a dehumidifier of the adsorption type which is so arranged as to pass automatically through a continuous series of dehumidifying and regenerating cycles.

Dehumidifiers using a moisture adsorbent bed of silica gel, or similar solid hygroscopic material, require means for circulating a stream of air through the bed to dehumidify the air, and also require some means to heat the bed periodically to regenerate the material by driving out the adsorbed moisture. Such dehumidifiers are extremely efficient; but present certain structural and operating problems which have not heretofore been satisfactorily solved, insofar as applicant is aware. For simplicity, the term "gel bed" will be employed throughout the specification as an exemplification of a pervious bed of solid hygroscopic material in the granular form which is suitable as an adsorption medium.

If an adsorption dehumidifier is to be fully automatic, controls must be provided which permit a stream of air passing through the gel bed to be directed alternately into the room which is being dehumidified, or into a stack when the device is on a regenerating cycle so that it is blowing very hot air. Such controls must be responsive to the condition of the stream of air after it has passed through the gel bed and may be controlled either by humidistats or thermostats, or a combination of the two.

The problem of providing such controls which are rugged, simple, inexpensive and readily mass-produced has been difficult of solution.

Either an electric heater or a gas burner may be used to heat the air passing through the gel bed for a regenerating cycle, and in many respects a gas burner is preferable to an electric heating element; but the use of a gas burner adds problems to the design and construction of a dehumidifier unit which are not present with an electric heater. The principal advantage of a gas burner is the speed with which it commences to heat the air stream, and the fact that when the fuel supply is cut off the unit dissipates its contained heat relatively rapidly. Furthermore, in certain areas gas fuel is substantially less expensive than is electricity.

Because of the high temperatures reached by the stream of air passing through the dehumidifier during a regenerating cycle, the only practical position for the fan which is used to move air through the gel bed is ahead of the bed. A blower constructed to be positioned in the stream of hot, moist air issuing from the gel bed must have its motor located outside the air stream, and must be constructed of relatively expensive materials in order that it will not corrode very rapidly in the hot air stream. This is particularly true where a gas burner is used, because of the corrosive nature of the combustion gases. If the blower is positioned ahead of the gel bed, an inexpensive centrifugal blower of ordinary commercial design may be used.

However, the use of a blower ahead of the bed creates a zone of static pressure in which no conventional gas burner can operate satisfactorily. As is well known in the gas appliance business, the amount of air required for complete combustion of gas depends upon the number of B. t. u.'s per cubic foot of gas. Thus, a normal mixture of natural gas and mixed gas which provides about 800 B. t. u.'s per cubic foot requires about ten parts of air to one of gas for complete combustion. Natural gas at about 1,000 B. t. u. requires more air, while entirely manufactured gas at about 550 B. t. u. requires considerably less air. The normal operating pressure at the primary air spud of a gas burner is about three to four inches of water, and normal appliance regulators are set to maintain such a pressure at the spud. If the burner head is in a zone of static pressure, this diminishes the net effective pressure at the spud, and as a result the rate of gas flow past the spud is reduced and the amount of air entrained by the gas passing the air inlet is also reduced. With a gel bed three to four inches deep and about sixteen inches in diameter, a four inch centrifugal blower operating at 3,000 R. P. M. will produce a static pressure ahead of the gel bed of about seven-tenths of an inch to one inch of water. Thus, if a gas burner is placed in this zone of static pressure, the net effectve gas pressure at the spud is only two to three inches, and the intake of primary air at the spud is reduced so greatly that the burner is extremely inefficient in operation. Applicant found that a conventional gas burner operating in such a zone of static pressure delivered only about 6,500 to 9,000 B. t. u. per hour, which resulted in a very long regeneration cycle.

In the dehumidifier here disclosed, the dehumidifier casing has an air inlet at the top, and a four inch centrifugal blower operating at 3,000 R. P. M. is located adjacent the inlet in such a position that it blows a stream of air straight down into the casing. A horizontal partition separates the blower chamber from a combustion chamber, and a gas burner is placed directly beneath the outlet of the blower.

A conversion plate, or baffle is placed between the blower and the burner, so as to distribute the stream of air around the periphery of the combustion chamber and make the static pressure substantially uniform over the entire area of the combustion chamber. It also reduces the large pressure drop which naturally results when air from a four inch orifice passes an abrupt enlargement into a sixteen inch chamber. An opening at the center of the conversion plate directly beneath the blower port directs a portion of the air onto the center of the burner, which is a single port burner having a solid cap and a continuous peripheral slot in its side wall to provide the burner port. Air passing through the opening in the conversion plate flows through a cylindrical air tube, the lower margin of which is positioned immediately above the burner port so as to direct a thin film of air uniformly to all parts of the flame, thus giving an ample supply of secondary air to compensate for the deficiency in primary air supply occasioned by placing the burner in a zone of static pressure. A properly designed conversion plate having a central opening to direct a portion of the air stream onto the burner cap permits the burner to deliver about 20,000 B. t. u. per hour as against the 6,500 to 9,000 which was possible without the opening the conversion plate. The air stream passing over the burner cap materially reduces the temperature of the burner cap, and tends to prevent flashbacks in the burner. A circular baffle at the bottom of the burner breaks up eddy currents which tend to create turbulence in the flame zone surrounding the burner port.

The gel bed is placed beneath the combustion chamber so that the air stream passes downwardly through it. It has been found that this is far superior to an air flow upwardly through the gel bed, because a downward flow keeps the particles in the bed uniformly compacted; whereas a flow from below tends to loosen the particles and form channels in the material, resulting in inefficient adsorption of moisture by the gel bed because only a fraction of the total adsorption surface is used once channels are established.

A control compartment below the gel bed contains two outlets, each with a valve, and the valves are arranged to open alternately so that the stream of air may be directed to the room during a dehumidifying cycle, or to a stack during a regenerating cycle. The control for the valves is preferably mechanical, so all the elements of the control mechanism may be fabricated from sheet metal in simple cutting and forming operations. The controls are entirely thermostatic, and bimetallic leaf springs are used for the preferred control mechanism. An electric control mechanism may be employed, and is also shown and described.

During a regenerating cycle, the air temperatures may go as high as 240° or 250° F. in the compartment below the gel bed. The gas burner operates only when the valve to the stack is open, and the control switch for the gas line cuts out to shut off the burner at about 190° F. This, of course, is the temperature of the moisture laden air coming from the gel bed—the actual burner compartment temperature may be 300° or more; and the gel bed heats differentially from top to bottom so that when the burner cuts off, the top of the bed may be close to 300° while the bottom is only 190° like the control compartment. This heat differential gradually moves downwardly as the burner compartment cools; so that the top of the gel bed cools before the bottom, which goes up gradually to a maximum of, perhaps, 250°, carrying the control compartment temperature up also. This effect is enhanced, of course, by the decreasing quantity of adsorbed moisture being vaporized from the gel bed. In order that the air shall not be too hot when a dehumidifying cycle commences, the thermostatic control for reversing the position of the valves and opening the return valve so that air goes to the room is set for approximately 140° to 150° F. Of course, the temperature of the top of the gel bed is much less than the temperature of the control compartment at that time. The dehumidifying cycle begins at that temperature, and continues with a steadily decreasing temperature below the gel bed as the cool room air passing through the bed takes heat out of it. This decrease in temperature is greatly slowed by the heat released due to adsorption of moisture into the gel. When a predetermined low temperature has been reached—conveniently about 90° F.—a second thermostatic control element switches the valves to open the exhaust valve to the stack and simultaneously closes the switch to admit gas to the burner.

With a gas burner of the efficiency heretofore described a regenerating cycle takes about 45 minutes and the duration of the dehumidifying cycle depends upon the relative humidity of the air in the room.

The capacity of the unit may be varied merely by changing the size of the blower to substitute one having a larger or smaller wheel, and by changing the primary air opening of the burner and changing the length of the secondary air tube to leave a larger or smaller space between the bottom of the air tube and the burner cap.

The invention is illustrated in the accompanying drawings, in which:

Fig. 4 is a section taken as indicated along the line 4—4 of Fig. 6.

Figure 1:
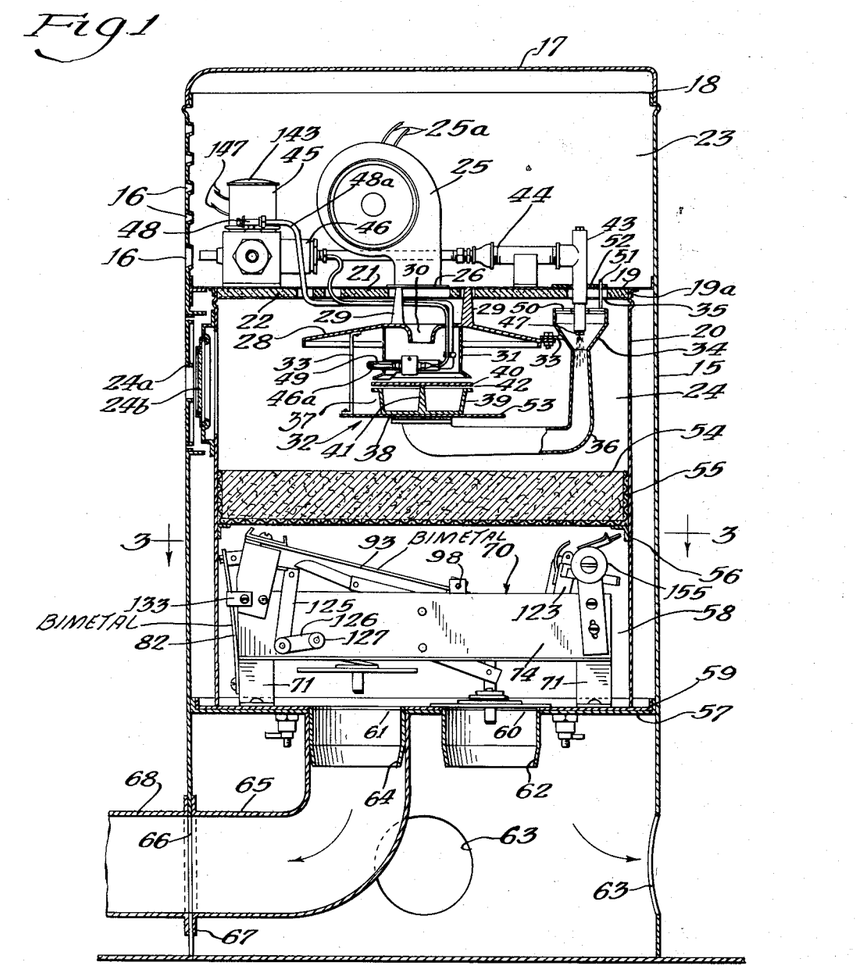
Fig. 1 is a vertical central sectional view of a dehumidifying unit, with the blower and preferred mechanical control valve mechanism shown in side elevation.
Figure 2:
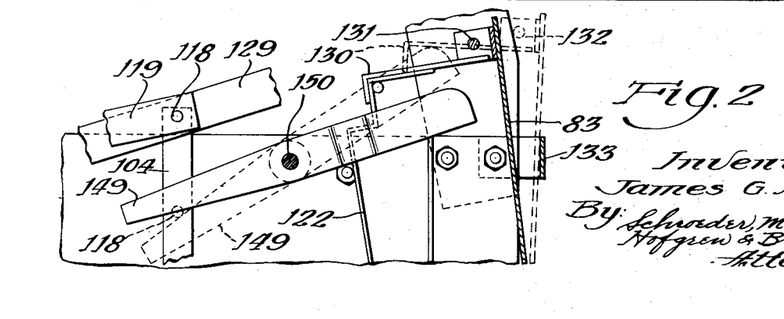
Fig. 2 is a fragmentary sectional view at one end of the mechanical valve control mechanism, to show the operation of a hook trip for one of the valve mechanism latches.
Figure 3:
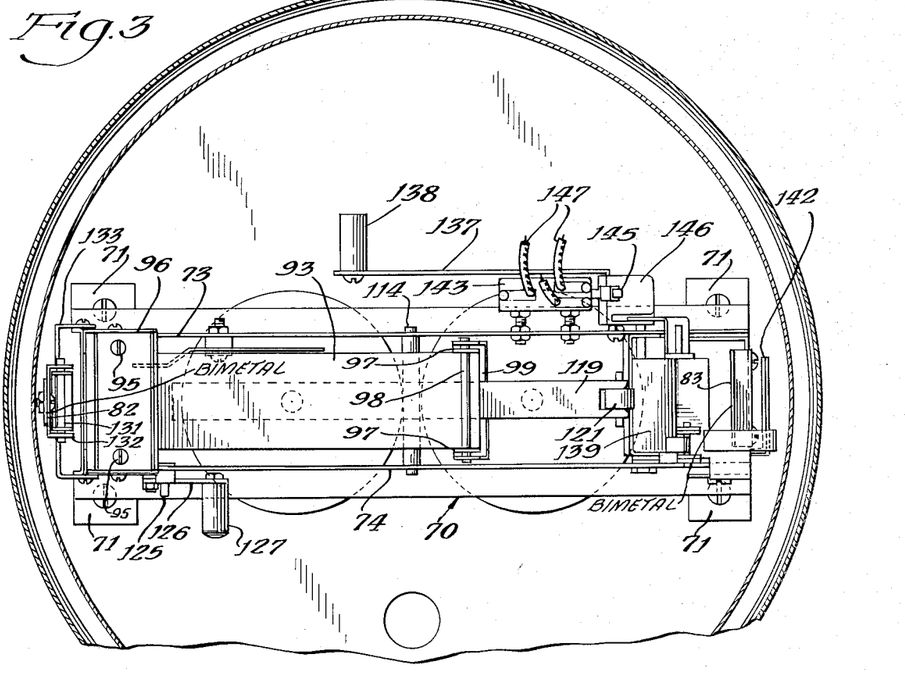
Figure 4:
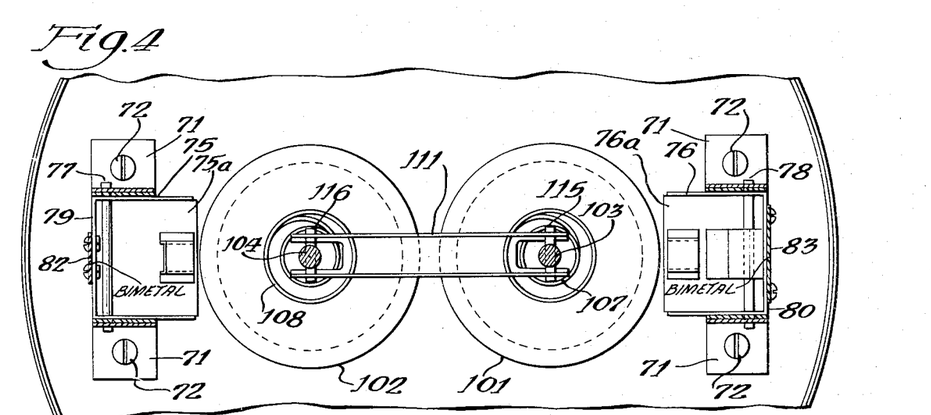
Fig. 4 is an enlarged section taken as indicated along the line 3—3 of Fig. 1.

Referring to the drawings in greater detail, and referring particularly to Fig. 1, the dehumidifying unit of this invention has an outer casing 15 having adjacent its upper end a series of apertures 16 which serves as an air intake. A closure 17 is preferably positioned on top of the casing 15, and has a continuous depending flange 18 which surrounds the upper end portion of the casing. Screws (not shown) may be used if desired to secure the closure 17 to the casing.

A horizontal partition 19 is supported on a flange 19a at the top of a cylindrical inner wall 20 of the casing, the partition 19 consisting of a metal plate 21 which has its underside covered with a layer of insulating material 22, such as asbestos board. The partition 19 defines the bottom of a blower compartment 23 and the top of a combustion chamber 24, the side wall of which is the inner casing 20. An access port having a hollow door 24a of conventional design is provided at one side of the casing 15 to give access to the burner compartment; the door being formed of sheet metal with a lining of asbestos board, and having a glazed window 24b. The space between the casing 15 and the inner casing 20 is packed with an insulating material such as fibre glass. A centrifugal blower 25 having a self-contained electric motor which is connected to an electric outlet by wires 25a is mounted on the partition 19 in the blower compartment 23 with its outlet 26 directed downwardly so that the stream of air from the blower passes through a port in the center of the partition 19. A 1/80 horsepower blower is adequate, and may operate continuously at very small cost.

A conversion plate 28, which is fastened to the horizontal partition 19 by means of brackets 29, has a central opening 30 which is positioned directly beneath the port 27 in the partition 19. The conversion plate, which is circular and extends somewhat more than half way across the combustion chamber, has a top surface which angles downwardly toward its periphery, so that air from the blower 25 impinging upon the conversion plate flows smoothly over the surface and downwardly off the margin of the plate. The conversion plate has a downwardly extending secondary air tube 31 surrounding the opening 30, and said air tube has a flaring lower margin.

A gas burner, indicated generally at 32 is suspended from the conversion plate 28 by means of brackets 33. The gas burner has an air spud 34 which is located above the conversion plate 28, immediately beneath an aperture 35 in the partition 19. An elbow 36 extends downwardly from the air spud 34 and has a single port burner head 37 secured at its inner end. The burner head 37 has a base 38, a unitary upstanding side wall 39, and a solid cap 40 which is supported in spaced relation to the upper margin of the side wall 39 by means of a central bracket 41 so as to provide a continuous peripheral flame port 42. The margin of the cap 40 is substantially in register with the lower margin of the air tube 31, and spaced only a short distance therefrom so that air passing through the air tube flows in a thin layer outwardly from the edge of the burner cap and combines with the combustible mixture issuing from the flame port 42 of the burner, providing an ample supply of secondary air.

A gas burner fitting 43 is positioned in the blower compartment 23, and is connected by a gas intake line 44 to a source of gas. Flow of gas to the burner fitting 43 is controlled by a solenoid valve 45, and by a Baso safety control 46 in the conventional fashion. The burner fitting 43 extends through the opening 35 in the partition 19, and has its burner orifice 47 in the air spud 34 in the usual fashion.

A pilot valve 48 is connected by tubing 48a to a pilot burner 49 which is mounted within the secondary air tube 31 with its burner orifice outside the wall of said air tube only a short distance above the burner cap 40. The pilot is of the continuously burning type, and since its burner orifice is above the lower margin of the secondary air tube 31 and beneath the conversion plate 28 it is in very quiet air where its flame is extremely steady. That fact, combined with the very close proximity of the pilot flame to the flame port 42 of the burner head 37, affords very dependable and positive ignition of the burner. The Baso control 46 includes a thermocouple 46a adjacent the pilot burner 49, which actuates the Baso control to shut off gas both to the burner 32 and to the pilot burner 49 in case the pilot flame is extinguished or is too low for positive ignition of the burner.

The upper end of the spud has an air shutter 50, and an air shutter control rod 51 extends upwardly from the air shutter through the opening 35 and has adjacent its upper end an adjustment plate 52 which fits snugly about the burner fitting 43 and overlies the margin of the opening 35. The air shutter 50 may thus be adjusted simply by manipulating the control rod 51 and adjustment plate 52. Preferably, conventional means are provided for locking the adjustment plate in any desired position. This may be accomplished by the use of a friction collar on the burner fitting, or other well known means.

A lower baffle 53 surrounds the base 38 of the burner head 37 to break up eddy currents which tend to form around the burner head, thereby preventing turbulence in the flame zone surrounding the flame port 42.

The bottom of the burner compartment 24 is defined by a pervious bed 54 of solid hygroscopic material which is in granular form. Silica gel is the preferred material for the adsorbent bed. The gel is carried in a foraminous tray 55 which rests on angle brackets 56 secured to the inner casing 20. It has been found that the dehumidifying unit functions adequately in dehumidifying the air in an average residential basement if the gel bed 54 contains about 18 pounds of silica gel in a bed sixteen inches in diameter and three to four inches deep.

Secured to the casing 15 a substantial distance below the gel bed is a horizontal partition 57 which defines the bottom of a control compartment 58 and serves as the support for the inner casing 20. The partition 57 is formed of sheet metal, and has an asbestos lining 59 to reduce heat transfer through the partition. A pair of ports 60 and 61 in the partition 57 serve, respectively, as a return air outlet and as an exhaust air outlet from the control compartment. The return port 60 has a collar 62 to receive any desired duct piping, although the return of air to the room may be without ducts, the air passing out of the casing through return orifices 63. The exhaust port 61 has a collar 64 to receive an exhaust duct 65 which communicates at its outer end with an exhaust aperture 66 and is secured to the casing 15 by a flange 67. A stack 68 may be secured to the outside of the casing 15 to receive air from the exhaust duct 65.

Figure 5:
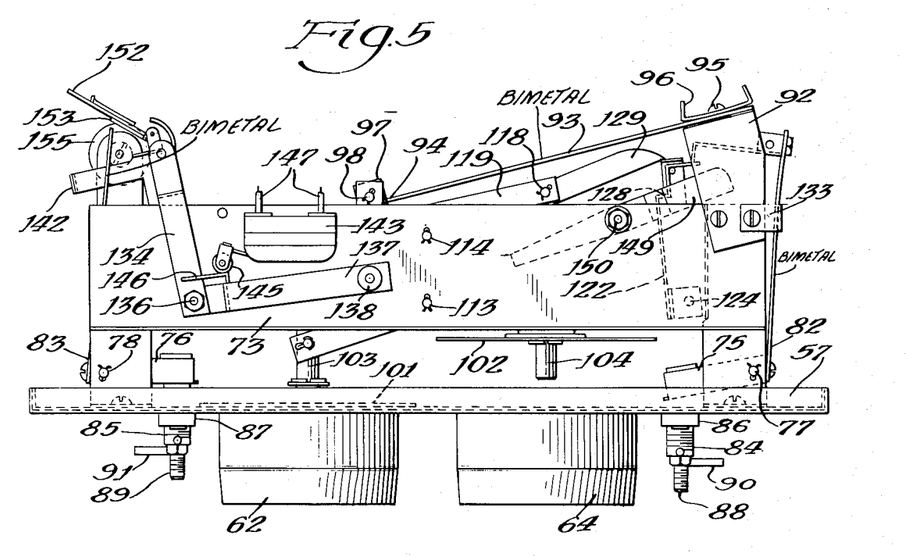
Figs. 5 and 6 are side elevations showing the two sides of the control mechanism.
Figure 9:
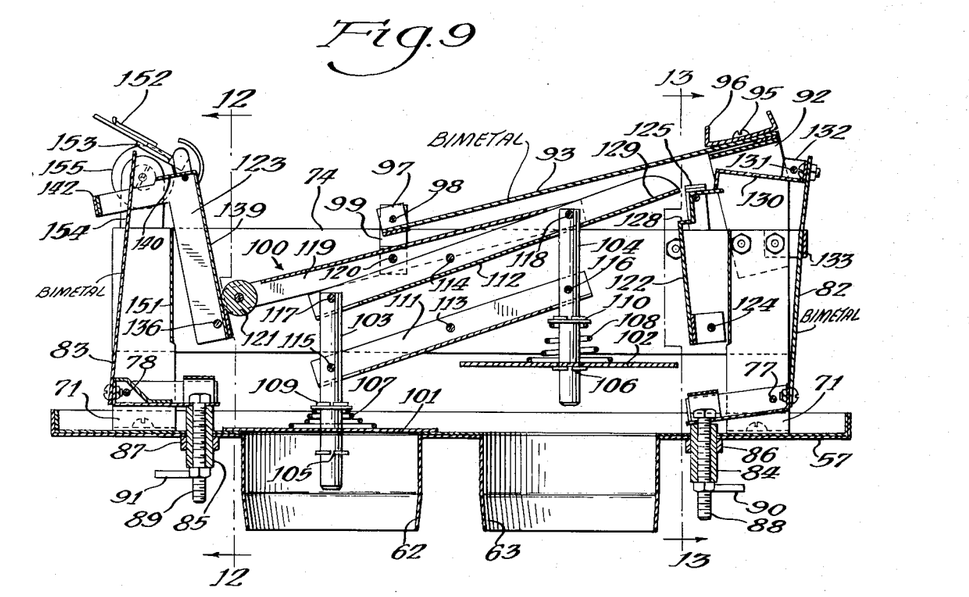
Fig. 9 is a section taken as indicated along the line 9—9 of Fig. 7 showing the control mechanism with the parts in the position which they occupy at the beginning of a regenerating cycle.

A control mechanism has a frame, indicated generally at 70, which includes four brackets 71, secured to the partition 57 with screws 72, and side plates 73 and 74. The control mechanism 70 affords fully automatic means to control the condition of the air stream issuing from the dehumidifier to the room. As best seen in Figs. 3 to 8 inclusive, a control bimetal support 75 and a second control bimetal support 76 are pivotally mounted on the upright portions of the angle brackets 71 below the side plates 73 and 74 by means of pivot pins 77 and 78, respectively. The supports 75 and 76 are tray-like members, having base plates 75a and 76a, respectively, upstanding sides to receive the pivots, and transverse end plates 79 and 80, respectively. A high temperature bimetallic control member 82 is secured to the end plate 79 of the support 75, and a low temperature bimetallic control member 83 is secured to the end plate 80 of the support 77. Both said bimetallic control members occupy generally upright positions between the side plates 73 and 74, and are so disposed as to bend inwardly with respect to the ends of the frame 70 when they are heated and outwardly with respect to the frame when they are cooled. In order that the normal position of the upper ends of the bimetallic control members 82 and 83 may be adjusted, as best seen in Figs. 5 and 9 the support members 75 and 76 have the inner ends of their base plates 75a and 76a supported on exteriorly threaded sleeves 84 and 85, respectively, said sleeves being vertically adjustable by means of nuts 86 and 87. The support members and sleeves are assembled by means of long bolts 88 and 89 which extend through the sleeves and are drawn tight by means of nuts 90 and 91, respectively, which are provided with finger pieces in order that they may be readily tightened. Thus, the positions of the bimetallic control members 82 and 83 with repsect to the vertical may be readily adjusted by proper setting of the hollow sleeves, the nuts 86 and 87 and the nuts 90 and 91. This permits adjustment of the temperatures at which said control members act upon the mechanical elements of the control mechanism.

Surmounting the frame at the end adjacent the high temperature bimetallic control member 82 is a bridge frame 92 on which is mounted a bimetallic power element 93 which has its free end 94 extending longitudinally above the frame 70. The power element 93 is so disposed that it warps upwardly as it heats and downwardly as it cools. The power element 93 is secured to the bridge plate by means of screws 95 which traverse an arcuate washer-like plate 96, which is curved longitudinally of the power element to permit the power element to warp freely.

At the free end 94 of the power element 93 are a pair of upstanding ears 97 to receive a pivot pin 98 on which a bifurcated link 99 is pivoted. The link 99 is part of a linkage mechanism, indicated generally at 100, by means of which a return valve 101 and an exhaust valve 102 for the ports 60 and 61, respectively, are controlled. The valves 101 and 102 are slidably mounted on vertical valve stems 103 and 104 respectively, and are urged downwardly against stops 105 and 106 by compression springs 107 and 108 respectively, which are coiled about the valve stems and retained in compression by fixed washers 109 and 110.

A pair of parallel links 111 and 112 are supported for rocking movement on pins 113 and 114 respectively, which extend across the frame and are mounted in the side plates 73 and 74. The link 111 is pivotally secured to the valve stems 103 and 104 by means of pivots 115 and 116 which are positioned slightly above the spring retainers 109 and 110, and the link 112 is likewise pivotally secured to the valve stems, adjacent their upper ends, by pins 117 and 118 which are equi-distant from the pins 115 and 116, respectively; so that the valve stems and the links 111 and 112 form a parallel linkage. The linkage mechanism 100 is completed by an operating link 119 which is pivoted at one end to the pivot 118 at the top of the exhaust valve stem and is pivotally secured by a pivot 120 to the link 99 at the free end of the bimetallic power element 93. The operating link 119 extends a substantial distance beyond the end of the power element 93 in the direction of the low temperature bimetallic control member 83, and has a rotatable bearing member 121 at its outer extremity.

The energy for movement of the valves 101 and 102 through the linkage mechanism 100 is derived from the bimetallic power element 93 as it heats and cools, and the movement is controlled to open and close the valves in the desired cycles by means of the bimetallic control members 82 and 83 acting, respectively, through a control latch 122 and an actuating arm 123.

The control latch 122 extends transversely of the frame and is pivoted adjacent its lower end on a pin 124 which is mounted in the side plates 73 and 74. A counterweight arm 125 secured to the top of the latch 122 extends downwardly outside the side plate 74, and has a longitudinal extension 126 with a counterweight 127 at its free end so as to normally tilt the upper end of the control latch toward the exhaust valve stem 104. The latch 122 has adjacent its upper end a generally horizontally disposed latch face 128 which is positioned to engage with an extension 129 on the parallel link 112. When the control latch 122 is in its normal, or latching position, and the exhaust valve 102 is open, so that the linkage mechanism 100 is in the position shown in Fig. 9 and Fig. 10, the latch surface 128 is beneath the extension 129 on the link 112 so as to prevent the exhaust valve 102 from closing. Movement of the control latch 122 from its latching position to a disengaged position is effected by means of a latch actuating hook 130 which is secured by means of a pivot 131 to a pair of ears 132 at the upper end of the high temperature bimetallic control member 82. Since the control member 82 flexes inwardly as it heats, and outwardly as it cools, closing of the exhaust valve and opening of the return valve may be made to occur at any desired point during the cooling of the bimetallic element 82 as a regenerating cycle is taking place. This is accomplished by suitable adjustment of the pivoted base 76 on which the high temperature control member 82 is mounted. Outward movement of the high temperature control member 82 is limited by a stop 133 which extends across the end of the frame and has ears at its ends by means of which it is suitably secured adjacent the upper margins of the side plates 73 and 74. When the control latch 122 is pivoted outwardly by the actuating hook 130, the energy which has been stored in the power element 93 by its flexure as it cools acts through the operating link 119 to close the exhaust valve 102 and open the return valve 101. As the end of the parallel link 112 adjacent the valve stem 104 moves downwardly a transverse projection on the pivot 118 for said link 112 contacts one end of a hook trip 149 which is mounted on a pivot 150 in the side plate 73. The outer end of the hook trip is thrown upwardly and engages the under side of the latch disengaging hook 130 to free the control latch 122 for movement to its normal position; so that in a regenerating cycle, when the exhaust valve 102 is again opened, the latch surface 128 of the latch 122 will again be in position to engage the extension 129 and retain the exhaust valve 102 in its open position.

The actuating arm 123 has a first supporting element 134 which is located outside the side plate 73 and a second supporting element 135 which is located inside the side plate 74; and the arm 123 is mounted for rocking movement about a pivot 136 at its base which is mounted in the side plates 73 and 74. A counterweight arm 137 provided with a counterweight 138 normally retains the actuating arm 123 in a position with its upper end tilted inwardly in line with the roller bearing member 121 on the extension of the operating link 119. As best seen in Fig. 12, the support element 134 is bent inwardly above the side plate 73 and has an upward extension above the plate to receive a transversely extending upright bearing plate 139 which is normally in contact with the roller bearing member 121. The bearing plate 139 has a latch surface 140 at its upper end. At the upper end of the support element 135 is an extension 141 which extends toward the low temperature control member 83 parallel to the side plates, and has a transversely extending control engaging bar 142 which is positioned to be contacted by the outer surface of the control member 83. When the control mechanism is set for a dehumidifying cycle with the return valve 101 open, the parts are in the position shown in Fig. 11 with the bearing member 121 supported on the latch surface 140 to hold the return valve open. As the temperature drops during a dehumidifying cycle, the low temperature bimetallic control member 83 flexes outwardly into contact with the transverse bar 142 and pivots the actuating arm 123 away from its normal position so that the bearing 121 rolls off the latch surface 140. As previously pointed out, the power element 93 flexes upwardly as it is heated and downwardly as it is cooled; and when the parts are in the position shown in Fig. 11 the power element is under substantial stress. Thus, when the bearing 121 is relieved of the support afforded by the actuating arm 123 the power element acts to drive the operating link 119 down and reverse the position of the valves, closing the return valve 101 and opening the exhaust valve 102. The downward movement of the roller bearing 121 along the bearing plate 129 tilts the actuating arm still farther from its normal position by a sort of wedging action.

Operation of the burner 32 is controlled by a microswitch 143 mounted on the side plate 73 adjacent the upright support element 134 of the actuating arm 123. The switch arm 144 of the microswitch 143 has a roller contact 145 which is supported on a switch control plate 146 at the lower end of the upright support element 134. The relationship between the roller contact 145 and the switch control plate 146 is such that when the actuating arm 123 is in the position shown in Figs. 5 and 9 the switch 143 is closed, permitting current to pass through the wires 147 to the solenoid 45, holding the solenoid valve open to admit gas to the burner 32. As the burner operates, the stream of air circulated by the blower 25 through the gel bed 54 increases in temperature causing the power element 93 to flex upwardly, thereby moving the roller bearing member 121 along the bearing face 139 of the actuating arm 123. As the roller bearing 121 moves upwardly on the bearing face 139 the counterweight 138 causes the actuating arm 123 to tilt toward its normal position, and when the temperature is reached at which the roller bearing frees the actuating arm for return to its normal position, the quick downward movement of the switch control plate 146 permits the switch arm 144 to drop rapidly and open the switch, thus cleanly breaking the circuit to the solenoid valve 45 and stopping the flow of gas to the burner 32. Inward travel of the low temperature control member 83 is limited by a transverse stop member 151.

A safety dog 152 is pivoted at the upper end of the support element 135 and extends above the area traversed by the end of the low temperature control member 83. There is a shoulder 153 on the lower surface of the dog 152 which may engage with the extreme upper end of the control member 83 as the control member warps inwardly as it heats. The shoulder 153 is engaged with the control member 83 at the time a dehumidifying cycle commences, or else is just inside the control member so that a very slight outward movement of the actuating arm 123 will engage those parts. The mechanism sustains a considerable jolt when the linkage 100 moves to reverse the positions of the valves 101 and 102, and in addition, as the valve 102 drops to its closed position the operating link 119 is moved linearly away from the actuating arm 123, and thus the roller 121 has a tendency to drop off the latch face 140 of the actuating arm 123 and permit the mechanism to skip the dehumidifying cycle entirely. Engagement of the shoulder 153 on the safety dog with the top of the control member 83 holds the roller bearing member 121 and the actuating arm 123 in engagement at this time.

Figure 6:
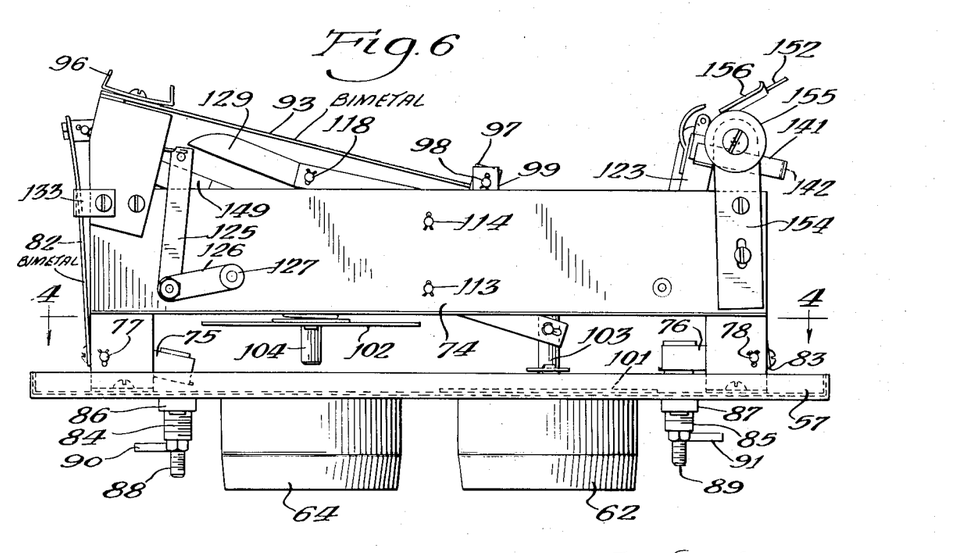
Figure 7:
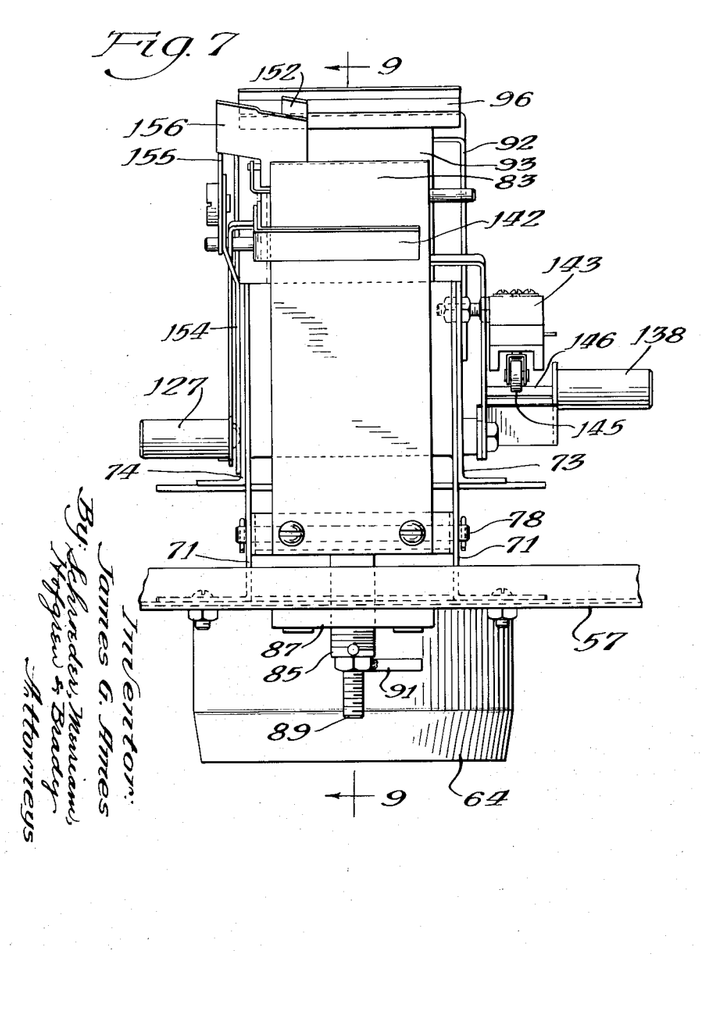
Figs. 7 and 8 are end elevations showing the two ends of the control mechanism.
Figure 8:
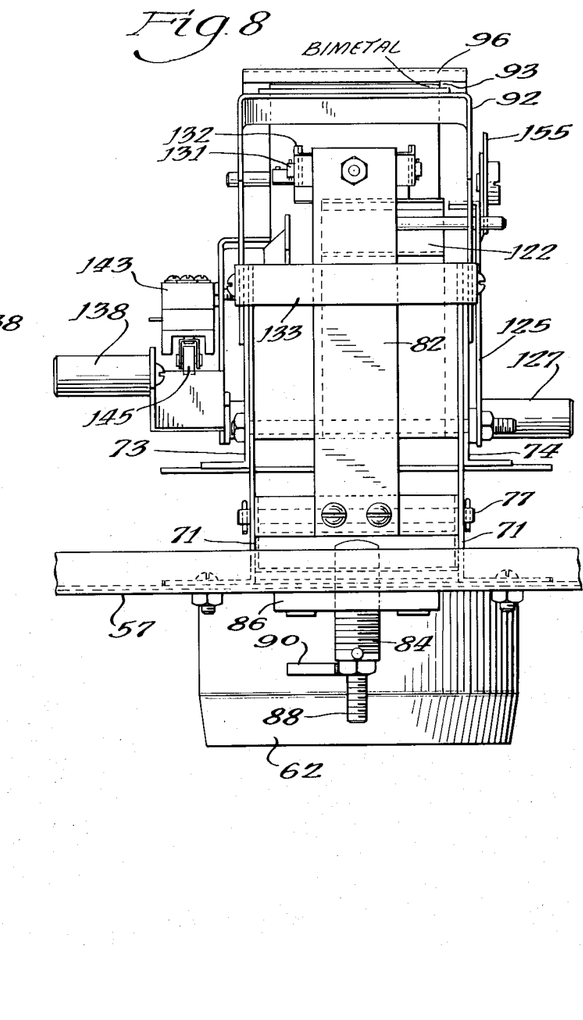

As best seen in Figs. 6 and 9, an upright cam support 154 is secured to the side plate 74 adjacent the control member 83 and has a cam member 155 at its upper end, said cam member being suitably positioned to contact a kick-out plate 156 on the safety dog 152 when the actuating arm 123 moves to the position shown in Fig. 9— that is, the position which it occupies at the beginning of a regenerating cycle. This elevates the safety dog 152 so that the shoulder 153 may ride free above the control member 83 as the movement of the roller bearing member 121 along the bearing surface 139 forces the actuating arm 123 to its limit position.

The operating cycle of the dehumidifier is believed to be clear from the foregoing description. At the beginning of a regenerating cycle, the parts of the valve mechanism are in the position shown in Fig. 9. The low temperature bimetallic control member 83 has acted against the transverse portion 142 of the actuating arm 123 to tilt said arm outwardly and release the operating link 119, so that the energy stored up in the bimetallic power element 93 as it cooled during the preceding dehumidifying cycle may drive the roller bearing member 121 downwardly along the bearing face 139 of said actuating arm 123. The roller 121 acts as a wedge preventing the arm from returning to its normal inwardly tilted position, and the switch control plate 146 is in its elevated position closing the microswitch 143 to start the gas burner 32. As hot air is blown through the gel bed 54 and the control compartment 58, the bimetallic power element 93 warps upwardly, and the two bimetallic control elements 82 and 83 warp inwardly. As the upward movement of the power element 93 progresses, the outer end of the extension 129 on the parallel link 112 comes to rest on the latch surface 128 of the latch member 122, and the roller 121 ascends along the bearing plate 139 of the arm 123. When the bearing reaches the upper extremity of the bearing plate 139 it frees the arm 123 so that the counterweight 138 may tilt the arm to its normal forwardly angled position. This movement of the actuating arm 123 drops the switch control plate 146 suddenly, releasing the switch arm 144 for rapid downward movement permitting a clean break of the contact in the microswitch 143. This cuts off the supply of gas to the burner 32 and stops the burner.

Figure 10:
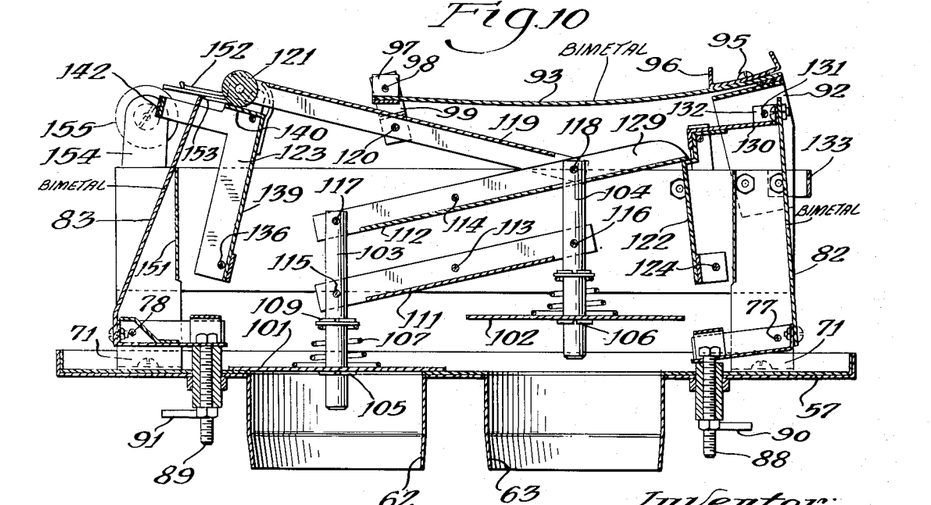
Fig. 10 is a view similar to Fig. 9 showing the parts of the control mechanism as they appear immediately before the end of a regenerating cycle.

Even though the burner is extinguished, the high temperature of the combustion chamber 24 and the top of the gel bed 54 continues to supply heat to the bottom of the gel bed, and the temperature continues to rise in the control compartment 58, as previously described. As this progresses, the bimetallic power element and the two bimetallic control members continue to warp to positions which are not shown in the drawings. The power element 93 warps upwardly until the roller 121 is a substantial distance above the latch surface 140, and the high temperature control member 82 warps inwardly until the hook 130 has overridden the top of the latch element 122 by a considerable distance. The low temperature control member 83 has moved underneath the shoulder 153 on the safety dog 152 while the dog was still in its elevated position, and is permitted to warp inwardly until its movement is stopped by the transverse stop member 151. After the stream of air has reached a maximum temperature of perhaps 240° F. the temperature drift is reversed and the three bimetallic elements reverse their motion. Ultimately, the operating link 119 is again supported upon the latch surface 140, but this time, as seen in Fig. 10, due to the fact that the actuating arm 123 has been freed entirely from the control of the roller bearing member 121, the arm 123 is tilted a sufficient distance forward that the roller is at the extreme rear edge of the bearing surface. This is so that the motion of the operating link 119 away from the arm 123 at the beginning of the dehumidifying cycle will not carry the roller off the latch surface 140. The hook 130 on the high temperature control element 82 is engaged with the upper margin of the latch 122, and the low temperature control element 83 is in an intermediate position between the stop 151 and the transverse bar 142 of the actuating arm 123, and its upper end is engaged with the shoulder 153 of the safety dog 152 so that the jolt as the valve positions are reversed cannot tend to jar the actuating arm 123 out from under the roller bearing member 121. The power element 93 has cooled sufficiently so that it is under substantial tension, and as soon as the high temperature control element 82 cools enough to pull the latch surface 128 from beneath the extension 129 of the link 112, the energy stored in the power element is exerted upon the linkage 100 to close the exhaust valve 102 and open the return valve 101, moving the parts to the positions of Fig. 11. This occurs at about 140° to 150° F. and starts a dehumidifying cycle.

Figure 11:
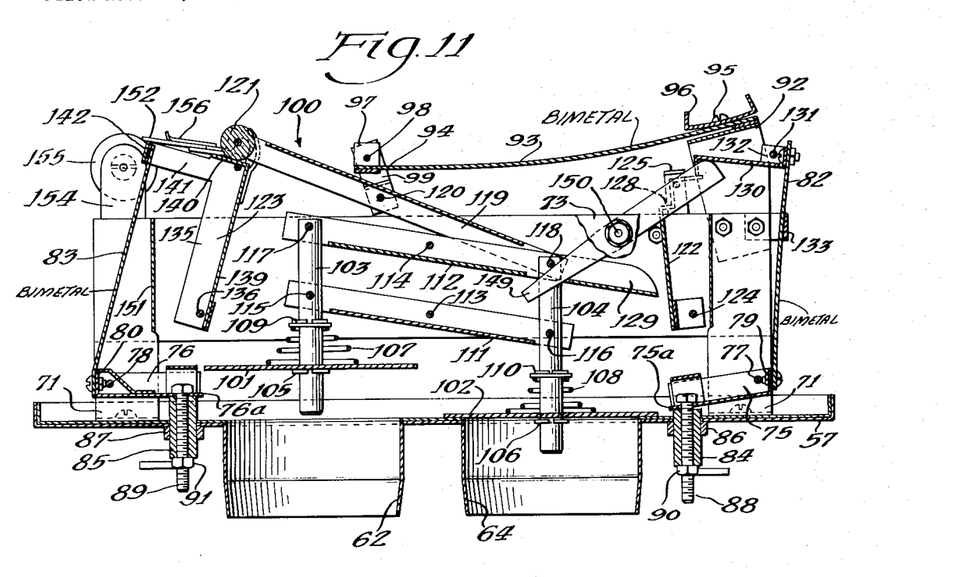
Fig. 11 is a view similar to Fig. 9, but with the section cut in such a way as to show the hook trip of Fig. 2, showing the parts of the control mechanism as they appear near the end of a dehumidifying cycle.
Figure 12:
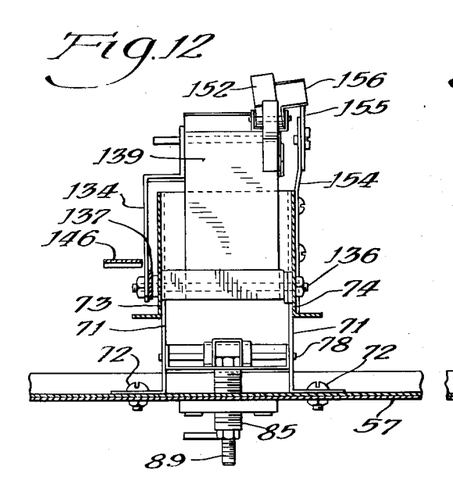
Fig. 12 is a section taken as indicated along the line 12—12 of Fig. 9.
Figure 13:
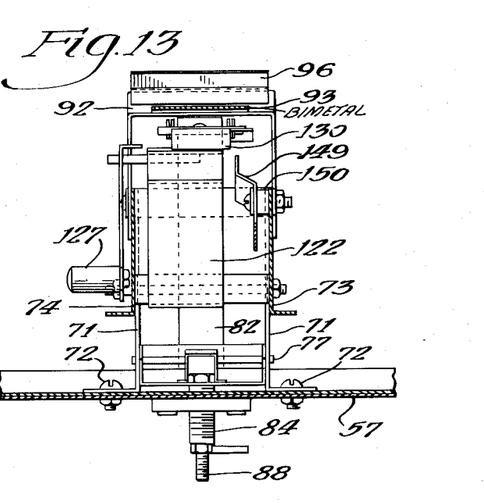
Fig. 13 is a section taken as indicated along the line 13—13 of Fig. 9.

As the linkage 100 moves to the position shown in Fig. 11, the pin 118 on the parallel link 112 contacts the hook trip 149 and throws its outer end into contact with the hook 130 to free the latch element 122 for movement to its normal position where it can engage the extension 129 at the start of the next regenerating cycle.

During the dehumidifying cycle, the temperature of the stream of air passing through the control compartment continues to drop as the relatively cool room air passes through the gel bed. As previously mentioned, this cooling is delayed by reason of the release of heat as moisture from the air is adsorbed by the gel bed. When the temperature of the air stream has approached the low limit for the dehumidifying cycle, the parts are in the position shown in Fig. 11. The continued cooling of the power element 93 has again warped it to store up further energy to perform the next movement of the valves, and the low temperature control member 83 is in contact with the transverse bar 142 of the actuating arm 123. As the low temperature control member 83 completes its outward movement, it acts upon the transverse bar 142 to pivot the actuating arm 123 and release the operating link 119, so that the energy stored up in the power element 93 may return the linkage to the position shown in Fig. 9, at which point a new regenerating cycle commences. When the actuating arm 123 is drawn outwardly by the low pressure control member 83 the safety dog 152 rides up on the surface of the cam member 155 to carry the shoulder 153 past the top of the control member 83.

Figure 14:
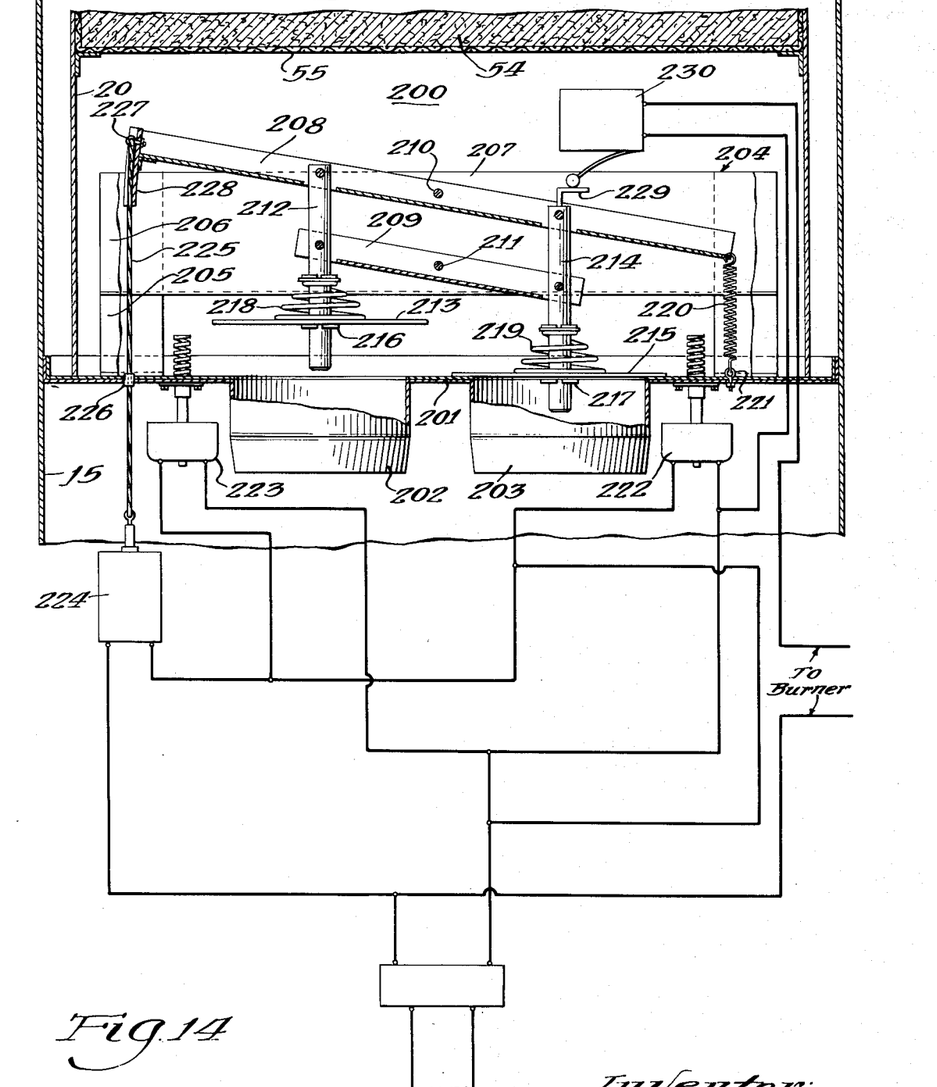
Fig. 14 is a partially diagrammatic, fragmentary partially sectional view of an electric control valve mechanism.

The alternative electrical system for controlling the valve mechanism is illustrated in Fig. 14, which is generally similar to Figs. 9 to 11, with the addition of the electrical control elements and circuit diagram. The mechanism includes a partition 201 forming the bottom of a control chamber 200, said partition being of similar construction and location to the partition 57 in the mechanical form. It is provided with a return port 202 and an exhaust port 203 which may be connected to suitable stacks or return piping which are not illustrated.

The control mechanism has a frame 204 which includes four brackets 205 secured to the partition 201 and a pair of side plates 206 and 207. A valve mechanism is supported in the frame, and includes a pair of parallel arms 208 and 209 which are pivoted at 210 and 211, respectively, in the side plates 206 and 207. The stem 212 of a return valve 213 and the stem 214 of an exhaust valve 215 are pivotally secured to the arms 208 and 209 so as to form a parallel linkage therewith, the valves being so positioned as to close the return port 202 and the exhaust port 203. The valves 213 and 215 are slidably mounted on the stems 212 and 214, respectively, and are urged downwardly against pins 216 and 217, respectively, by springs 218 and 219.

The arm 208 extends beyond the valves 213 and 215 at each end, and at the end adjacent the exhaust valve 215 a tension spring 220 is secured to the arm 208 and to a cleat 221 on the partition 201. Thus, the valves are normally held in a position with the return valve 213 open and the exhaust valve 215 closed.

Actuation of the valve mechanism is afforded by a regenerating limit control 222 in a primary control circuit and a dehumidifying control 223 in a holding circuit acting upon a solenoid 224. The solenoid 224 is positioned immediately below the end of the arm 208 which is adjacent the return valve 213 and a cable 225 secured to the movable solenoid member extends through a bushing 226 in the partition 201 and has its upper end secured at 227 to the end of the arm 208. A guide channel member, or quadrant 228 is secured to the arm 208 so as to keep the cable in line with the end of the arm 208 in the usual manner.

As shown by the wiring diagram, the solenoid 224 is controlled both by the regenerating control 222 and the dehumidifying control 223, the circuits for said controls and solenoid being such that the valve operation is the same as in the mechanical unit previously described. The control 222 is a standard high-low temperature limit control of the type which is used in automatic warm air heating systems. It is set to close at 90° F. and to open at 200° F. This type of control is available from certain manufacturers of heating system controls. The solenoid 224 is wired to a source of electric power through the primary control circuit and the regenerating control 222, and also through the holding circuit and the dehumidifying control 223. The latter control is set to close on an ascending temperature cycle at 140° F. and to open on a descending temperature cycle at the same temperature. Both have their switch portions positioned below the partition 201 and their thermostatic portions projecting through apertures in said partition into the control chamber.

When the dehumidifier is approaching the 90° bottom limit on a dehumidifying cycle as described with respect to the mechanical control unit, the valves are in the position shown in Fig. 14, with the return valve 213 open and the exhaust valve 215 closed. The valve mechanism is held in this position by the tension spring 220. When the temperature of the air in the control chamber gets down to 90° F. the thermostatic element in the regenerating control 222 acts to close the switch in said control, thus energizing the solenoid 224 which thereupon acts through the cable 225 to overcome the force of the spring 220 and reverse the positions of the valves 213 and 215. As the valve 215 opens, a switch trip 229 on top of the valve stem 214 closes a microswitch 230 in a heater circuit which controls the flow of gas to the burner. Thus, the burner starts as soon as the exhaust valve 215 is open. When the regenerating control 222 reaches a temperature of 200° F. the thermostatic element in the control member acts to open the control switch. The heater circuit is wired through the regenerating control 222 so that when this control opens at 200° it breaks the heater circuit and cuts off the flow of gas to the burner, though the microswitch 230 is still closed.

As the temperature in the control chamber increases during the regenerating cycle, the dehumidifying control 223 in the holding circuit, closes at 140° so that even though the circuit is broken through the regenerating circuit 222 current still reaches the solenoid through the holding circuit. The valves, therefore, are retained in the same positions with the exhaust valve 215 open so that the hot gases are passing to the stack. The temperature drift which was described with respect to the mechanical control carries the temperature in the control chamber up; ultimately the temperature drops, and when it reaches 140° on the descending cycle the dehumidifying control 223 reverses its position, opening the circuit to the solenoid 224 and permitting the spring 220 to again return the valves to their original positions with the return valve 213 open.

While it is possible to eliminate the microswitch 230 and control the flow of gas to the burner solely by the opening and closing of the regenerating control at 90° and 200°, it is far more desirable to employ the separate microswitch 230 which is actuated by the opening of the exhaust valve 215. This is for the reason that a control of the burner directly from the regenerating control 222 would permit the burner to function even though there was a failure of the solenoid which would leave the valves in their dehumidifying positions. Thus, the microswitch prevents operation of the burner except when the exhaust valve is open.

It is clear from the foregoing description of the electrical control arrangement that it provides the same cyclical operation of the dehumidifier which is afforded by the mechanical control first described.

The foregoing detailed description is given for clearness of understanding only and no unnecessary limitations are to be understood therefrom, as some modifications will be obvious to those skilled in the art.

I claim:

1. A room dehumidifier comprising: a casing having an air inlet near its top; a previous bed of solid hygroscopic material in said casing; a gas burner above said bed, said burner having a solid cap and a side wall with a laterally open flame port; a blower positioned to blow air downwardly over said burner and through said bed; a conversion plate between said blower and said burner, said conversion plate having an opening by means of which part of the stream of air from the blower is caused to impinge upon the solid cap of the burner and flow generally uniformly over the side wall thereof adjacent said flame port; valve means below the bed to selectively and alternately direct said stream of air to the room or to a stack; and means to operate said burner only when said valve means is directing the stream of air to the stack.

2. The room dehumidifier of claim 1 in which an air tube surrounds the opening in the conversion plate and has its lower end spaced close above the solid burner cap and substantially at the periphery thereof to provide a narrow, annular air port immediately above the flame port of the burner.

3. The room dehumidifier of claim 2 in which a pilot burner has its flame port positioned adjacent the outer wall of the air tube close to the air port.

4. The room dehumidifier of claim 1 in which a baffle is positioned beneath the burner to reduce air turbulence about the burner.

5. The room dehumidifier of claim 1 in which the conversion plate substantially meets the casing above the burner, and a gas conduit for the burner has its primary air inlet above said plate.

6. A room dehumidifier comprising: a casing having an air inlet near its top; a pervious bed of solid, hygroscopic material in said casing; a gas burner above said bed, said burner having a solid cap and a side wall with a substantially continuous laterally open flame port; a blower positioned to blow a stream of air downwardly over said burner and through said bed; a conversion plate between said blower and said burner, said conversion plate having a central opening by means of which the stream of air from the blower is caused to impinge upon the solid cap of the burner and flow generally uniformly over the side wall thereof adjacent said flame port; a baffle below the burner to reduce air turbulence about the burner; valve means below the bed to selectively and alternately direct said stream of air to the room or to a stack; and means to operate said burner only when said valve means is directing the stream of air to the stack.

7. The room dehumidifier of claim 6 in which an air tube surrounds the opening in the conversion plate and has its lower end spaced close above the solid burner cap and substantially at the periphery thereof to provide a narrow, annular air port immediately above the flame port of the burner.

8. A room dehumidifier comprising: a casing having an air inlet near its top; a pervious bed of solid hygroscopic material in said casing; a blower adjacent said air inlet to blow a stream of air downwardly through said bed;

thereby creating a zone of static pressure above the bed; a gas burner in said zone of static pressure having a peripheral flame port; a conversion plate above said burner to control the flow of said stream of air, said conversion plate being constructed and arranged to deliver a substantial supply of secondary air to the periphery of said burner adjacent said flame port; valve means below the bed to selectively and alternately direct said stream of air to the room and to a stack; and means to operate said burner only when said valve means is directing the stream of air to the stack.

9. The room dehumidifier of claim 8 in which the burner has a solid cap and the conversion plate has an opening to direct part of the stream of air directly onto said solid cap.

10. The room dehumidifier of claim 9 in which an air tube surrounds the opening in the conversion plate and has its lower end spaced close above the solid burner cap and substantially at the periphery thereof to provide a narrow, annular air port immediately above the flame port of the burner.

11. A room dehumidifier comprising: a casing; a blower chamber in the top of said casing having an air inlet and having a central port in its bottom wall; a blower in said chamber positioned and arranged to direct a stream of air downwardly through said port; a combustion chamber beneath the blower chamber; a gas burner having a solid top and a peripherally open side wall positioned in said stream of air; a conversion plate above said gas burner having a central opening whereby part of the stream of air impinges substantially centrally on the solid top of the burner and flows generally uniformly over the side wall thereof adjacent said peripheral opening; a pervious bed of solid, moisture adsorbent material in said stream of air below said burner; a compartment below said bed having a return outlet to direct said stream of air to the room and an exhaust outlet to direct said stream of air to a stack; valve means for said outlets; means to move said valve means to open said outlets alternately; and means to operate said burner only when said exhaust outlet valve is open.

12. In a room dehumidifier having a casing which contains a pervious bed of solid hygroscopic material in combination with means to circulate a stream of air from room through said bed and heater means for heating said stream of air before it reaches said bed, means to control the condition of the air stream issuing from the dehumidifier to the room, comprising: a compartment into which said stream of air passes after passing through said bed, a rigid control frame in said compartment; a bimetallic power element secured at one end to said frame and having a free end which moves as the temperature changes in the compartment; linkage means secured to the free end of said power element; a return valve and an exhaust valve operatively connected to said linkage means so as to open and close alternately, said opening and closing being effected by biasing the power element; a control switch to start and stop the heater means; means controlled by the movement of the power element to close said switch and start the heater when said exhaust valve opens and subsequently to open said switch and stop the heater; and bimetallic control means acting mechanically upon said linkage to control the opening and closing of said valves.

13. The air condition control means of claim 12 in which the bimetallic control means includes a first bimetallic member secured at one end to the frame, in combination with a latch which is positioned to be moved by movement of the free end of said first bimetallic member to permit the biasing of the power element to close the exhaust valve; and a second bimetallic member secured at one end to the frame, in combination with an operating arm which is positioned to be moved by movement of the free end of said second bimetallic member to permit the biasing of the power element to open the exhaust valve.

14. In a room dehumidifier having a casing which contains a pervious bed of solid hygroscopic material in combination with means to circulate a stream of air from a room through said bed and heater means for heating said stream of air before it reaches said bed, means to control the condition of the air stream issuing from the dehumidifier to the room, comprising: a compartment into which said stream of air passes after passing through said bed; a rigid control frame in said compartment; a bimetallic power element secured at one end to said frame and having a free end which moves as the temperature changes in the compartment; a return valve and an exhaust valve beneath said frame, said valves having parallel, upright stems; a pair of parallel links connecting said stems; a linkage pivoted adjacent the upper end of the exhaust valve stem and at the free end of said power element, said linkage having an extension adjacent the return valve provided with a bearing member; a control switch on said frame to start and stop the heater means; a control switch operating arm pivoted on said frame with a portion operatively engaging said control switch; means continuously urging said operating arm into engagement with the bearing member on the extension, said control switch and operating arm being positioned and arranged to hold the switch closed and the heater in operation until the movement of the free end of the power element disengages the bearing member from the operating arm and permits the operating arm to assume a supporting position beneath said bearing member; a pivoted latch to selectively engage a portion of the parallel linkage adjacent the exhaust valve to hold said valve open as the power element moves; a first bimetallic control element to trip said latch, whereby the power element may close the exhaust valve and open the return valve; and a second bimetallic control element positioned to engage said operating arm and move it from its supporting position whereby the power element may close the return valve and open the exhaust valve.

15. In a room dehumidifier having a casing which contains a pervious bed of solid hygroscopic material in combination with means to circulate a stream of air from a room through said bed and heater means for heating said stream of air before it reaches said bed, means to control the condition of the air stream issuing from the dehumidifier to the room, comprising: a compartment into which said stream of air passes after passing through said bed; a rigid control frame in said compartment; a bimetallic power element secured at one end to said frame and arranged to have its free end warp upwardly as the temperature increases in said compartment; linkage means pivoted on the free end of said power element; a return valve and an exhaust valve having upright stems which are pivoted to parts of said linkage means to form a parallel linkage whereby said valves may close alternately; a first rigid extension on said linkage means adjacent the return valve and a second rigid extension thereon adjacent the exhaust valve; an operating arm provided with means urging it to a position beneath said first extension; a pivoted latch provided with means urging it to a position beneath said second extension; a first bimetallic control element provided with means whereby as it cools it may move said latch from beneath said second extension to permit said exhaust valve to close and said return valve to open; a second bimetallic control element provided with means whereby as it cools it may move said operating arm from beneath said first extension to permit said exhaust valve to open and said return valve to close; and switch means controlled by movement of said power element to start said heater means as said exhaust valve opens and subsequently to stop said heater means.

16. The apparatus of claim 15 in which the operating arm has an extension which engages the switch means to start and stop the burner.

17. The apparatus of claim 16 in which the operating arm contacts the first extension to keep the switch means closed and the heater means operating until a predetermined temperature is reached, and the first bimetallic control member subsequently closes the exhaust valve when a predetermined lower temperature is reached.

18. In a room dehumidifier having a casing which contains a pervious bed of solid hygroscopic material in combination with means to circulate a stream of air from a room through said bed and heater means for heating said stream of air before it reaches said bed, means to control the condition of the air stream issuing from the dehumidifier to the room, comprising: a compartment into which said stream of air passes after passing through said bed; a return valve in the compartment to control the flow of the stream of air into the room; an exhaust valve in said compartment to control the flow of the stream of air to a stack; solenoid means to move said valves so that they open alternately; a switch arranged to close when the exhaust valve opens to start the heater; a temperature responsive switch controlling said solenoid means to open the exhaust valve at a predetermined low temperature and to stop the heater at a predetermined high temperature in an ascending temperature cycle; a holding circuit for said solenoid means to retain said exhaust valve in an open position after the heater is off; and a temperature responsive switch in said holding circuit controlling said solenoid means to close the exhaust valve in a descending temperature cycle at a temperature intermediate between said low and high temperatures.

19. In a room dehumidifier having a casing which contains a pervious bed of solid hygroscopic material in combination with means to circulate a stream of air from a room through said bed and heater means for heating said stream of air before it reaches said bed; automatic means for causing said dehumidifier to pass through a continuous series of dehumidifying and regenerating cycles, comprising: a compartment into which said stream of air passes after passing through said bed; a return valve in said compartment to control the flow of the stream of air into a room; an exhaust valve in the compartment to control the flow of the stream of air to a stack; means for opening said valves alternately; temperature responsive means in said compartment causing said exhaust valve to open at a predetermined low temperature; means to start said heater simultaneously with the opening of said exhaust valve to start a regenerating cycle; temperature responsive means in said compartment to stop said heater at a predetermined high temperature in said regenerating cycle; temperature responsive means to close said exhaust valve at a predetermined temperature between said low and said high to start a dehumidfying cycle; and holding means to permit said exhaust valve to close only during a period of descending temperature in said regenerating cycle.

20. The device of claim 19 in which the heater is started by the opening of the exhaust valve.

21. In a room dehumidifier having a casing which contains a pervious bed of solid hygroscopic material in combination with means to circulate a stream of air from a room through said bed and heater means for heating said stream of air before it reaches said bed, means to control the condition of the air stream issuing from the dehumidifier to the room, comprising: a compartment into which said stream of air passes after passing through said bed; valve means in the compartment which is movable between a dehumidifying position in which it returns the stream of air to the room and a regenerating position in which it diverts the stream to a stack; solenoid means to move said valve means selectively between said positions; a switch arranged to close and start the heater when said valve means moves to regenerating position; a temperature responsive switch controlling said solenoid means to move the valve means to regenerating position at a predetermined low temperature and to stop the heater at a predetermined high temperature in an ascending temperature cycle; a holding circuit for said solenoid means to retain said valve means in regenerating position after the heater is off; and a temperature responsive switch in said holding circuit controlling said solenoid means to move the valve means to dehumidifying position in a descending temperature cycle at a temperature intermediate between said low and high temperatures.

References Cited in the file of this patent

UNITED STATES PATENTS

| 2,201,688 | Zuhlke | May 21, 1940 |
| 2,248,225 | Fonda | July 8, 1941 |
| 2,283,990 | Higley | May 26, 1942 |
| 2,328,521 | Wittman | Aug. 31, 1943 |
| 2,413,771 | Luaces | Jan. 7, 1947 |
| 2,471,376 | Peters | May 26, 1949 |
| 2,486,472 | Harris | Nov. 1, 1949 |
| 2,501,280 | Kemp et al. | Mar. 21, 1950 |
| 2,561,441 | Lou | July 24, 1951 |
| 2,572,009 | Carson | Oct. 23, 1951 |
| 2,633,928 | Chamberlain | Apr. 7, 1953 |